United States Patent [19]

Ainoura

[11] 4,202,222
[45] May 13, 1980

[54] METHOD FOR PREPARATION OF SPHERICAL HOB FOR GENERATION OF GEAR

[76] Inventor: Masato Ainoura, 1253 Eguchi, Kita-Shiegeyasu-cho, Miyaki-gun, Saga-ken, Japan

[21] Appl. No.: 916,690

[22] Filed: Jun. 19, 1978

[30] Foreign Application Priority Data

Jun. 22, 1977 [JP] Japan .................................. 52/74142

[51] Int. Cl.² ............................................ B23F 17/00
[52] U.S. Cl. ............................... 76/101 A; 51/94 CS; 51/288; 409/11
[58] Field of Search ................. 76/101 A; 51/94 GS, 51/95 GH, 105 HB, 288; 407/26; 90/4

[56] References Cited

U.S. PATENT DOCUMENTS 1,357,815  11/1920  Olson .................................. 76/101 A Primary Examiner—Z. R. Bilinsky
Attorney, Agent, or Firm—Jordan and Hamburg

[57] ABSTRACT

A method for the preparation of a spherical hob for generation of a gear, which has a plurality of hob blades formed on the surface of a spherical hob blank, is disclosed. This method comprises forming spirally on the peripheral surface of the hob blank projections having a section defining an involute tooth profile by means of a cutting tool, cutting and forming a plurality of blade spaces intersecting said projections to thereby form a plurality of spirally continuous hob blades, and forming reliefs on the side faces and peripheral face of each hob blade so that as the blade faces of the hob are cut, the tooth profile of each hob blade corresponds to the tooth profile before cutting with a certain amount of addendum.

4 Claims, 26 Drawing Figures

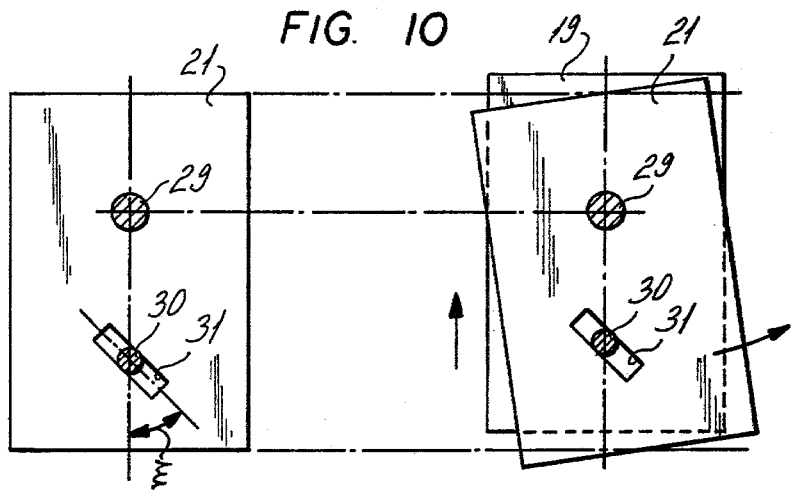
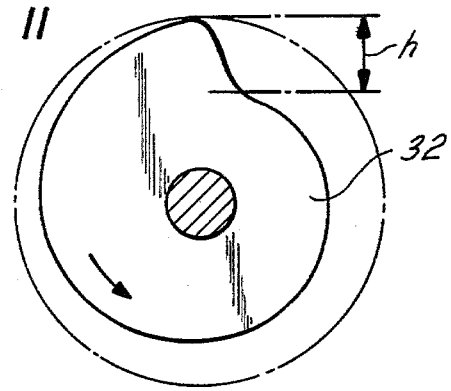
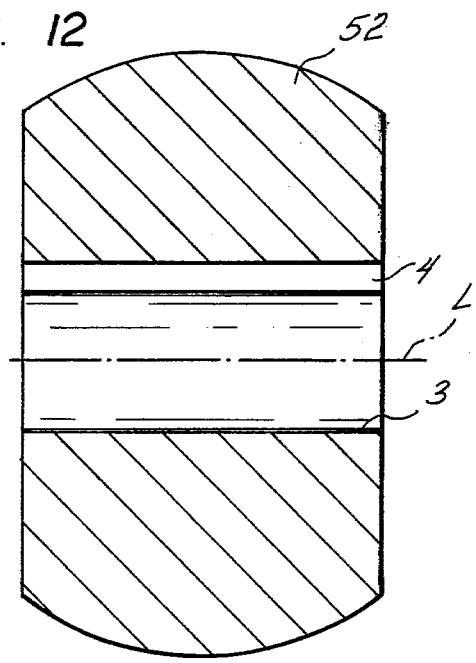
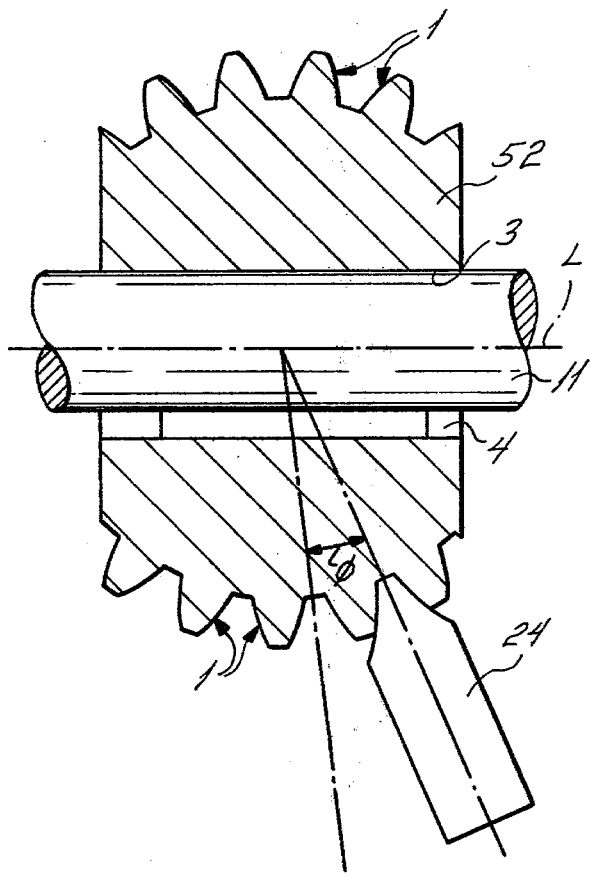

METHOD FOR PREPARATION OF SPHERICAL HOB FOR GENERATION OF GEAR

BACKGROUND OF THE INVENTION

The present invention relates to a method for the preparation of a spherical hob for generation of an involute gear and also to an apparatus for use in practicing this method.

A cylindrical hob is commonly used for cutting involute, and other, gears. However, a cylindrical hob can be used only for cutting external gears, not internal gears. Internal gears are generally cut by means of a gear cutter having a pinion type cutter. In a very few cases, internal gears are cut by means of a single position hob and single point tool. Gear cutting by means of a pinion type cutter is inferior to hobbing in cutting efficiency and cutting precision. When gears are cut by means of a single position hob or single point tool, cutting precision is not good and the life of the tools is shorter than the life of a cylindrical hob.

It has been found that the disadvantages of the prior art can be overcome by providing a spherical hob for cutting an involute gear. In specific embodiments herein illustrated, the hob is frustospherical, being equally truncated at opposite ends of its axis of rotation due to provision of a bore to receive a shaft the axis of which constitutes the axis of rotation. Since the hob is, nevertheless, in principle, spherical, the term "spherical hob" as employed herein is intended to encompass such frustoconical configurations.

It is a primary object of the present invention to provide a method according to which a spherical hob for cutting an involute gear can easily be prepared.

Another object of the present invention is to provide an apparatus by means of which a spherical hob for generation of an involute gear can easily be prepared.

Other objects and features of the present invention will be apparent from the following embodiments and claims, and many advantages not specifically mentioned herein will also be apparent to those skilled in the art when the present invention is practiced.

SUMMARY OF THE INVENTION

According to the invention, there is provided a method for the preparation of a spherical hob for generation of a gear, which comprises rotating a spherical hob blank about an axis passing through the center thereof and simultaneously rotating a cutting tool having a profile corresponding to a tooth space of an involute gear about the center of the hob blank and along the peripheral surface of the hob blank on a plane passing through the axis, thereby to form projections having a section in the form of an involute tooth profile spirally on the peripheral surface of the hob blank, then forming by cutting on the peripheral surface of the hob blank a plurality of equidistantly arranged spaces across the projections, thereby to divide the projections into a plurality of spirally continuous hob blades, each having an involute tooth profile, and finally forming reliefs on the side faces and the peripheral face of the hob blades. In the resulting spherical hob provided according to the present invention, as the blade faces of the hob blades are cut and sharpened, the tooth profile of an imaginary gear generated by rotation of the hob about the axis is gradually displaced to attain an addendum to the tooth profile, whereby after cutting and sharpening of the hob blade faces after the faces have become dull from use in cutting gears in gear blanks, shifting of the hob toward a new gear blank by a distance corresponding to the magnitude of undercut of the peripheral relief results in cutting in the new gear blank of a gear generated in gear blanks before cutting and sharpening of the blade faces.

The shperical hob is also disclosed in my copending application Ser. No. 916,689, filed simultaneously herewith, entitled "Spherical Hob for Generating Gears," the disclosure of which is hereby incorporated herein by reference.

BRIEF DESCRIPTION OF THE DRAWINGS

FIG. 6($b$) is a partial plan diagram of the attaching portion showing the bed thereof in a turned state;

FIG. 10 is a plan diagram illustrating the relation between the horizontal movement of a substrate plate and the turning movement of a cutting tool-fixing plate when the pin is inserted in the pin receiving hole;

FIG. 11 is a plan view of the cam;

FIG. 12 is a sectional view of a hob blank processed to have a spherical configuration;

FIG. 13 is a sectional view showing the cutting of a projection on the hob;

DETAILED DESCRIPTION OF A PREFERRED EMBODIMENT

Figure 1:
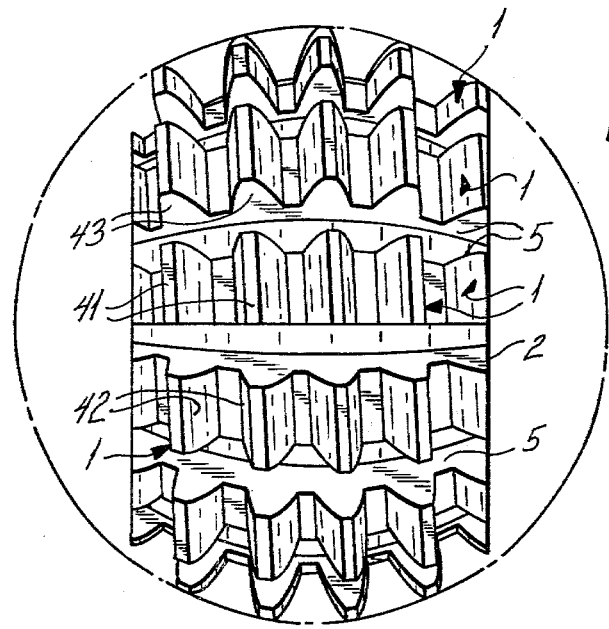
FIG. 1 is a front view of a spherical hob.
Figure 2:
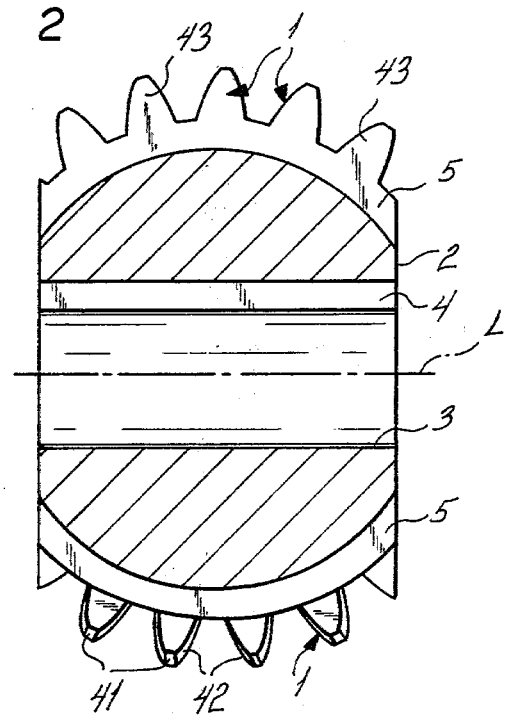
FIG. 2 is a sectional view of the spherical hob shown in FIG. 1.
Figure 3:
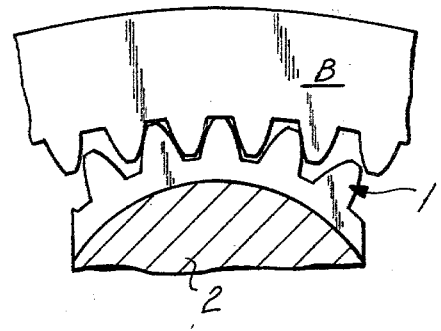
FIG. 3 is a partially sectional view illustrating the state where an internal gear is generated by cutting by the spherical hob.
Figure 4:
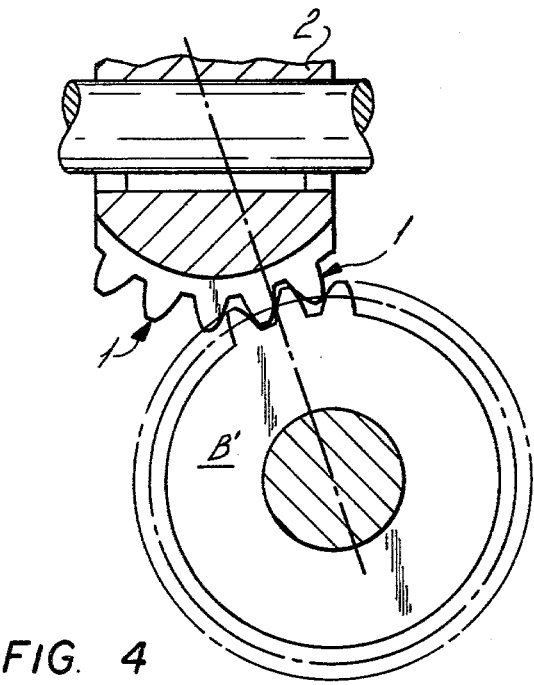
FIG. 4 is a partially sectional view illustrating the cutting of a spur gear by the spherical hob.
Figure 6B:
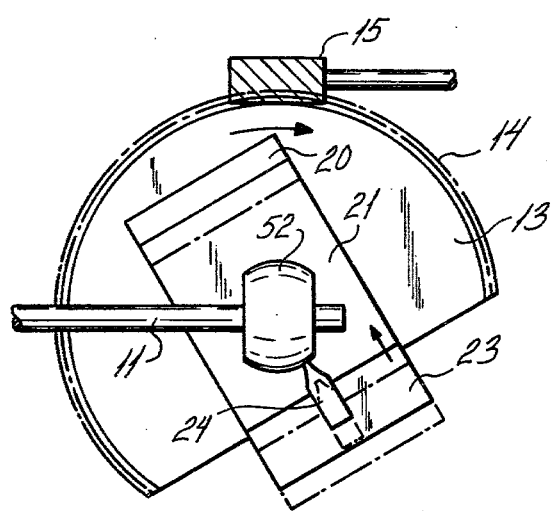
FIG. 6($a$) is a perspective view illustrating a cutting tool attaching portion of the apparatus of FIG. 5.
Figure 16A:
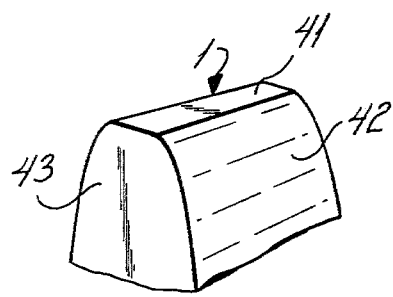
FIGS. 16($a$), 16($b$) and 16($c$) are perspective, side and plan views of the hob blade.

Shown in FIGS. 1 and 2 is a spherical hob 2 in which hob blades 1 are continuously and spirally arranged on the spherical surface. When the spherical body of the hob 2 is rotated about its axis L, it is as if an imaginary involute gear were rotated about a diametrical axis L through any plane including the axis L. The hob 2 is so rotated to cut a gear, the blades 1 cutting involute internal gear teeth in a blank B (FIG. 3). As the cutting proceeds, the blades 1, in effect, constitute involute gear teeth engaging conjugate involute gear teeth formed in the blank B. The blank B is thus machined into an internal gear, which has been impossible by means of a cylindrical hob. Further, by use of the spherical hob 2, there is attained an advantage in the cutting of external gears, too, namely that a radial axis of the blank B' intersecting the center of the hob 2 need not be perpendicular to the axis of rotation L of the hob 2, as shown in FIG. 4, which is indispensable in the cylindrical hob. Moreover, registering of the axis of the hob and the axis of the blank, which is indispensable in the use of a single position hob for internal gears, can be omitted. However, in the spherical hob 2, since rotation of an imaginary gear is effected by the rotation of the hob 2, if reliefs of the same type or in the same direction are formed on both the tooth crest 41 and side faces 42 of the hob blade 1, when the blade face 43 (FIGS. 16(a), (b), (c)) is cut for sharpening if it is worn, the outside diameter of hob 2 is diminished by the cutting and a tooth profile equal to the tooth profile before cutting cannot be generated.

A specific embodiment of the present invention will now be described by reference to FIGS. 5 to 21 of the accompanying drawings.

An apparatus for machining a hob of the present invention will now be described by reference to FIGS. 5 to 10.

Figure 7:
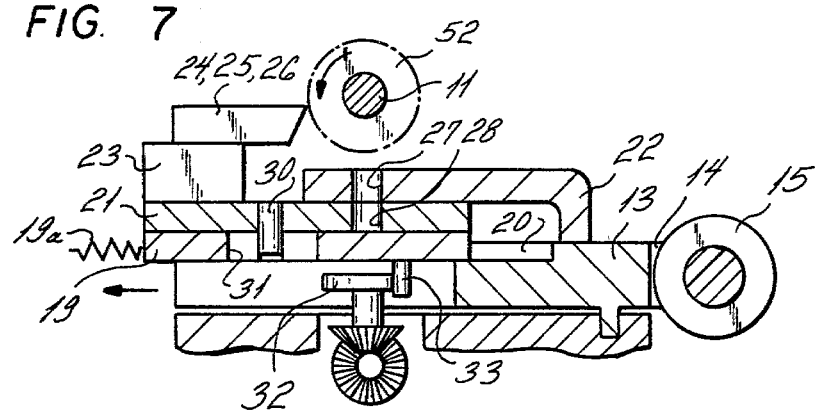
FIG. 7 is a sectional view of a cutting portion of the apparatus of FIG. 5, showing a cutting tool in a position in which it has been retracted by the action of a cam.

A hob blank 52 is attached and fixed to one end of a supporting shaft 11 which is positively turned counterclockwise in FIG. 7 by a motor 12. A substantially semicircular swivel table 13 is disposed below the attachment position of the hob blank 52 so that the hob blank 52 can be rotated to the left and right about the center of the hob blank 52. A worm gear 14 is formed on the peripheral face of the swivel table 13, and a worm 15 engages the worm gear 14 so that the rotation of the supporting shaft 11 is transmitted to the swivel table 13 through an imaginary gear tooth number indexing mechanism 16, transmission shaft 17 and gear transmission mechanism 18 to turn the swivel table 13 to the right or left. The tooth number indexing mechanism 16 is arranged so that the rotation speed of the swivel table 13 is made to agree with the rotation speed of the imaginary gear generated by the rotation of the hob by changing gears.

Figure 5:
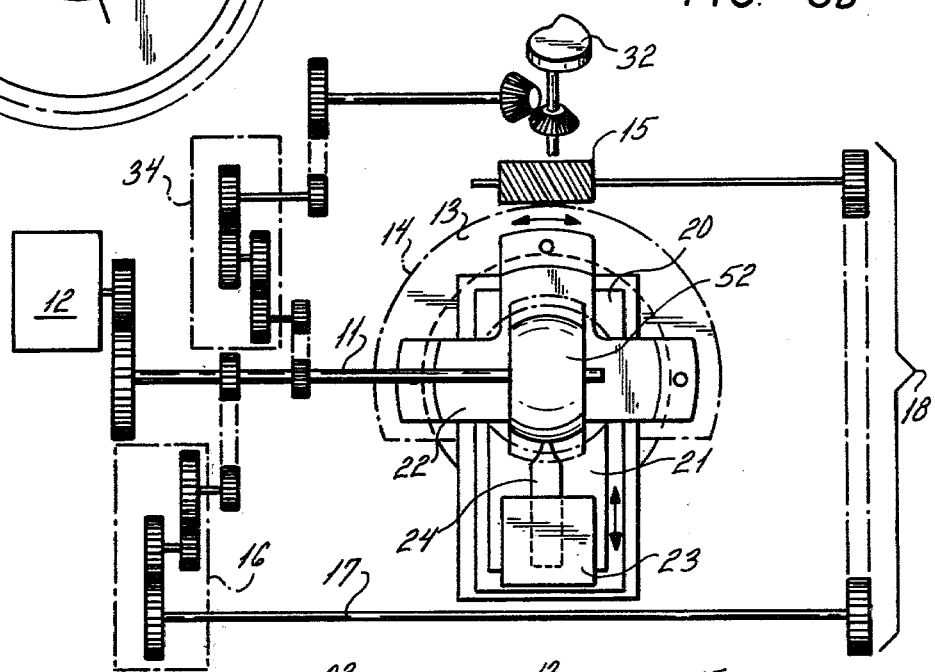
FIG. 5 is a plan diagram illustrating a hob making apparatus according to one embodiment of the present invention.
Figure 6A:
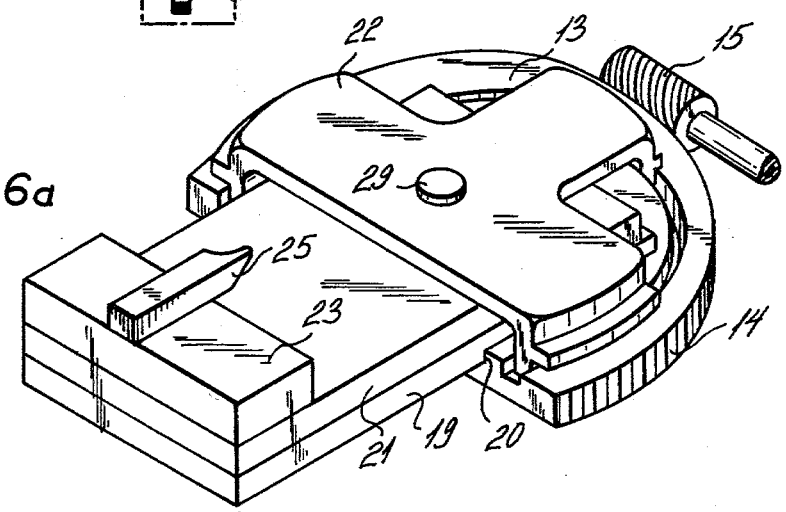
Figure 8:
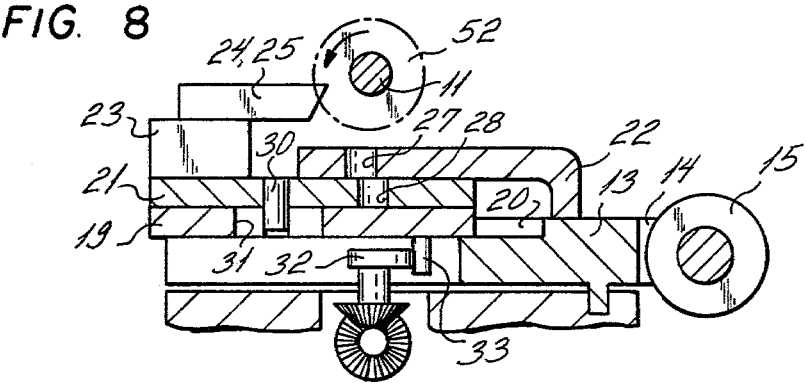
FIG. 8 is a sectional view of the cutting portion, showing the cutting tool in a position in which it has been advanced.
Figure 9:
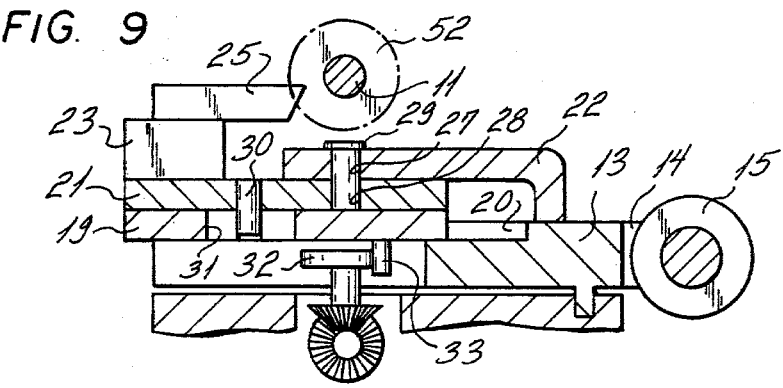
FIG. 9 is a sectional view of the cutting portion illustrating the state thereof in which a pin has been inserted in a pin receiving hole.
Figure 14:
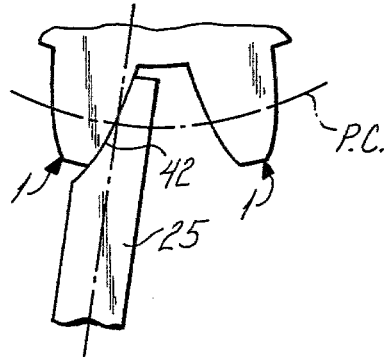
FIG. 14 is a partial plan diagram showing the cutting of a side relief on a projection on the hob.
Figure 15A:
FIGS. 15($a$), 15($b$) and 15($c$) are partial plan diagrams illustrating a cutting tool for the tooth space profile, a cutting tool for a side of the tooth space profile and an ordinary cutting tool, respectively.
Figure 15B:
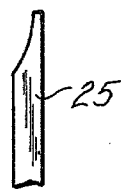
Figure 15C:
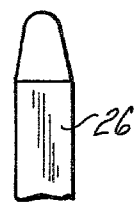

A substrate plate 19 is disposed in a concave part 20 on the top face of the swivel table 13 as shown in FIGS. 7 to 9 movably to and fro horizontally as shown by arrows in FIGS. 5, 6(a), 6(b) and 7, and it is urged in the retracting direction (the direction indicated by the arrow in FIGS. 6(a) and 7 by a spring 19(a) (FIG. 7). A cutting tool fixing plate 21 is dismountably fixed onto the top face of the substrate plate 19, and a fixing member 22 is fixed to the swivel table 13 to bridge over the cutting tool fixing plate 21. A cutting tool attaching stand 23 is disposed on the rear end of the top face of the cutting tool fixing plate 21, and cutting tools 24, 25 and 26 for cutting the hob material 52 are alternatively attached thereto. Tool 24 has a crest including a profile of the space between teeth of an involute gear, tool 25 has a crest including a half such profile and tool 26 has an ordinary rounded crest, as shown in FIGS. 15(a), 15(b) and 15(c), respectively.

The first half of the process of preparing the hob will now be described. During the first half of the process, the hob blank 52 is processed into a spherical configuration, projections having a profile corresponding to an involute tooth profile are spirally formed by cutting on the surface of the spherical body, and spaces are formed by cutting to divide the projections into blades. More specifically, first a hob blank 52 initially of rectilinear configuration and through which an attachment hole 3 and a key groove 4 have been formed is attached and fixed to the supporting shaft 11, and the ordinary cutting tool 26 is attached and fixed to the cutting tool attaching stand 23 with the cutting tool 26 engaging the left hand extremity of the blank 52 when the apparatus is viewed as in FIG. 6(b). Then, the motor 12 is started to rotate the supporting shaft 11 counterclockwise in FIG. 7 and turn the swivel table 13 in the clockwise direction in FIG. 6(b), whereby the hob material is cut into a spherical shape as shown in FIG. 12. In this case, the cutting operation is carried out so that the outer diameter of the hob blank 52 will satisfy the following relation: $D = m \cdot Z + 2.5 \cdot m + b$ wherein D stands for the outside diameter of the spherical hob blank 52, m designates the module of the imaginary gear, Z designates the number of teeth of the imaginary gear and b stands for the amount of increase of the diameter.

Then, the cutting tool 24 is exchanged for the cutting tool 26 and the peripheral surface of the hob blank 52 is cut and processed by the cutting tool 24. In this cutting step, projections, a cross section of which taken axially of the hob blank 52 constitutes an involute tooth profile, are spirally formed on the periphery of the hob blank 52 so that when the hob blank 52 is rotated, rotation of an imaginary involute gear is effected. Namely, the cutting operation is conducted in such a manner that every time the hob blank 52 makes one rotation, the cutting tool 24 is turned along a distance corresponding to one tooth of the imaginary gear with the center of the hob blank 52 being the center of turning. Accordingly, supposing that the tooth number of the imaginary gear is Z, as shown in FIG. 13, the angle $\phi$ of the rotation corresponding to one tooth is expressed as follows:

$$\phi = \frac{2\pi}{Z} \text{ rad}$$

Thus, the rotation speed of the swivel table 13 is adjusted by the tooth number indexing mechanism 16 so that the above relation is established. Accordingly, the rotation of the so cut hob blank 52 about the axis L effects the rotation of the imaginary gear having the tooth number Z.

Figure 16B:
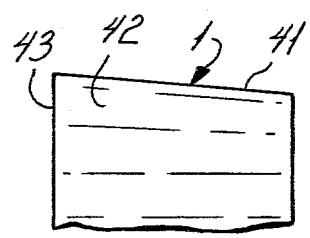
Figure 16C:
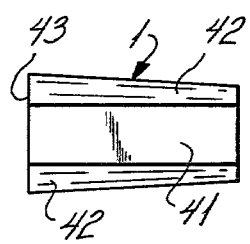
Figure 17:
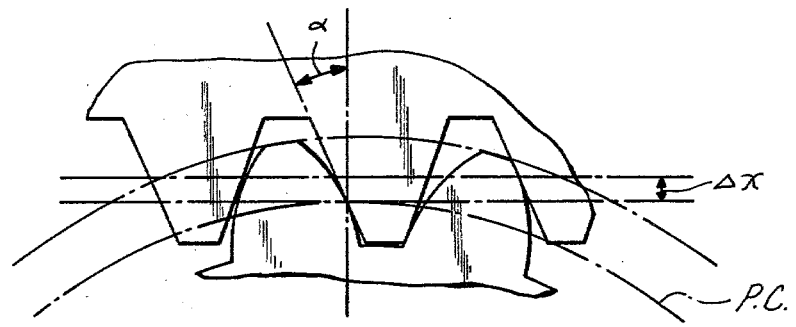
FIG. 17 is a partial plan diagram illustrating the relation between the amount of addendum and the tooth thickness.

Then, the hob blank 52 is dismounted from the supporting shaft 11, and the hob blank 52 is cut by a cutting mill (not shown) so that an appropriate number of blade spaces 5 in planes including the axis L are equidistantly formed on the peripheral surface of the hob 52, as shown in FIGS. 1 and 2. Accordingly, hob blades 1 which are spirally continuous and having involute tooth profiles on both the sides of the blade faces 43 are formed on the peripheral surface of the hob blank 52 (FIG. 16).

The mechanism and method for formation of a relief on the tooth crest 41 of the hob blade 1 (hereinafter referred to as a "peripheral relief") will now be described. A cam 32 is disposed below the substrate plate 19 as shown in FIG. 7, and a cam follower in the form of a roller 33 on the lower face of the substrate plate 19 is brought into sliding contact with the cam 32 by the urging action of a spring (not illustrated) and is driven by the cam 32. As shown in FIG. 11, in the cam 32, the amount of the change of the cam face (i.e., the decrease in the radius of the cam from the maximum to the minimum thereof) per unit angle is constant, and the transition from the minimum diameter to the maximum diameter is abrupt. Accordingly, as the cam 32 rotates one revolution, the substrate plate 19 is advanced at a certain speed through the driven roll 33 and, then, the substrate plate 19 is abruptly retracted in the direction indicated by the arrow in FIG. 7. Therefore, the cutting tool attached and fixed to the cutting tool attaching stand 23 is caused to make a similar movement.

Referring to FIG. 5, a relief indexing mechanism 34 is disposed to transmit the rotation of the supporting shaft 11 to the above-mentioned cam 32. The indexing ratio can optionally be adjusted by changing of gears.

For formation of the peripheral relief, the hob blank 52 is attached and fixed to the supporting shaft 11 again, the ordinary cutting tool 26 is exchanged for the cutting tool 24 and the cutting tool 26 is set at the position of the blade crest 41 of the hob blade 1. Then, the indexing ratio of the relief indexing mechanism 34 is adjusted. More specifically, the cutting tool 26 is gradually projected toward the center of the hob blank 52 synchronously with the frequency at which the hob blade 1 passes through the cutting position, and just before the subsequent hob blade 1 arrives at the cutting position, the cutting tool 26 is abruptly returned to the position before the projecting movement.

When the relief of the flutes parallel to the hob axis is performed, the revolution of the cam is N revolutions per 1 revolution of the hob (N=number of hob flutes), so the indexing ratio $\eta_0$ for the flutes is $\eta_0 = FN$ (F=machine constant). But in a case of the spherical hob relief performing, the follower 33 which contacts the cam 32 is fixed on the relief performing base plate as in FIG. 21, so that the contact point moves from T to T' when the swivel table rotates at the rate of $\phi$. This results in cutting $\Delta h$ deeper per 1 revolution of hob. So the cam rotation should be less at the rate of $\phi$ per 1 revolution.

Namely, while the hob blank 52 makes one rotation, the tool 26 rotates by $2\pi/Z$ rad as pointed out hereinbefore. Supposing that $2\pi/Z$ rad is expressed as $\alpha$ and the number of the blade spaces 5 is N, if the cam rotates ($N - \alpha/2\pi$) revolutions for every revolution of rotation of the hob blank 52, the crest faces 41 of all the hob blades 1 can be generated by cutting. Accordingly, the indexing ratio $\eta_1$ is expressed as follows:

$$\eta_1 = F(N - \frac{\alpha}{2\pi})$$

Since $\alpha$ is equal to $2\pi/Z$, the indexing ratio $\eta_1$ can be expressed as follows:

$$\eta_1 = F(N - \frac{2\pi/Z}{2\pi})$$
$$= FN(1 - \frac{1}{NZ})$$

Accordingly, if the adjustment is made by the relief indexing mechanism 34 so that the indexing ratio for one rotation of the hob material is equal to $FN(1-1/NZ)$, the peripheral relief forming operation can be precisely made on the respective hob blades being rotated.

Figure 18:
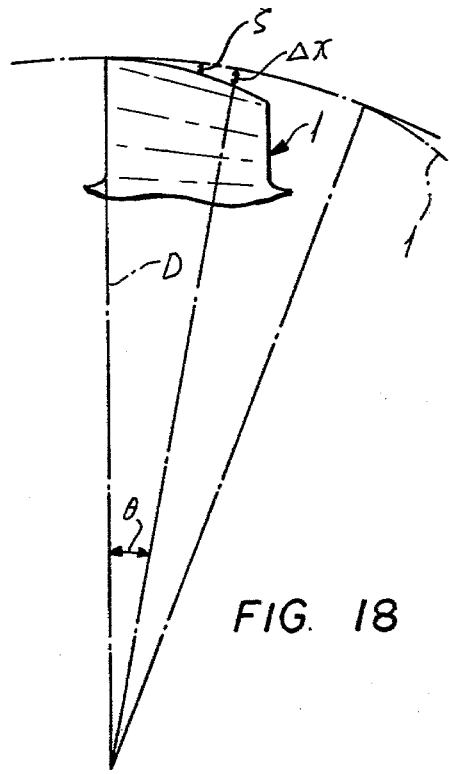
FIG. 18 is a side diagram illustrating the relation between the amount of the undercut of the peripheral relief and the undercut angle.

The angle $\eta$ of this peripheral relief is calculated from the following formula, as seen from FIGS. 11 and 18:

$$\tan \eta = \frac{h}{\frac{\pi D}{N}} = \frac{Nh}{\pi D}$$

wherein h designates the amount of the change of the cam face of the cam 33 (i.e., the difference between the maximum and minimum radii of the cam 33) and D stands for the outer diameter of the hob blank 52.

The amount $\Delta x$ of the undercut of the peripheral relief with respect to the central angle $\theta$ of the hob blank 52 is calculated according to the following formula, as shown in FIG. 18:

$$\Delta x = \frac{\frac{\pi D \cdot \theta \cdot h}{360}}{\frac{\pi D}{N}} = \frac{N \cdot \theta \cdot h}{360}$$

The mechanism and method for forming the side reliefs on the hob blade 1 will now be described. Referring to FIG. 7, a pin receiving hole 27 is formed through the fixing member 22 along the line passing through the center of the swivel table 13, and a similar pin receiving hole 28 is formed through the cutting tool fixing plate 21. A pin 29 can be inserted into these pin receiving holes 27 and 28. When the pin 29 is inserted in the holes 27 and 28, the cutting tool fixing plate 21 is allowed to turn with respect to the substrate plate 19 with the pin 29 being the center of turning. A guide pin 30 is projected from the lower face of the rear end part of the cutting tool fixing plate 21 and is inserted into an inclined guide groove 31 formed on the substrate plate 19 so that it can move to the front and rear. In this arrangement, when the substrate plate 19 is advanced by rotation of the cam 32, the cutting tool fixing plate 21 is turned to the left with the pin 29 inserted in the pin receiving holes 27 and 28 acting as the center of turning as shown in FIG. 10. Accordingly, also the cutting tool attaching stand 23 is turned to the left with the pin 29 acting as the center of turning, and by this turning of the stand 23, the cutting tool 25, which is attached to the stand 23, is allowed to cut into the hob blank 52 along the pitch circle of the imaginary gear generated by the hob blank 52 so that the blade profile is made thinner by an addendum corresponding to the undercut of the peripheral relief with respect to the side face 42 of the hob blade.

More specifically, when the quantity of addendum is $\Delta x$, the amount of the change of the tooth thickness on the pitch circle P.C. of the involute tooth profile is expressed as follows:

$$2 \cdot \Delta x \cdot \tan \alpha$$

supposing that the module is m and the pressure angle is $\alpha$. Accordingly, if the circular tooth thickness on the pitch circle P.C. is reduced by $2 \cdot \Delta x \cdot \tan \alpha$, an involute tooth profile can be obtained.

Figure 19:
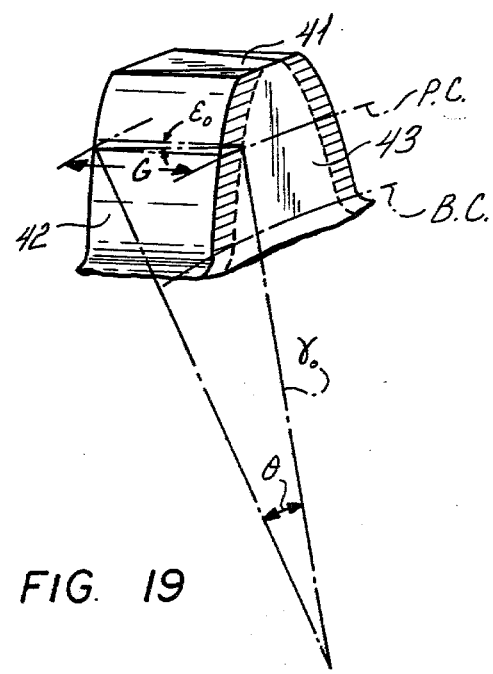
FIG. 19 is a perspective diagram illustrating the relation between the amount of addendum of the side relief and the addendum angle.

The angle $\epsilon_0$ necessary for reduction of said thickness by $2\cdot\Delta x\cdot\tan\alpha$ is expressed as follows, as seen from FIG. 19;

$$\epsilon_0 = \tan^{-1}\frac{\Delta S/2}{G}$$

wherein $\Delta S$ stands for $2\cdot\Delta x\cdot\tan\alpha$, $\theta$ designates the central angle of the hob material 52 necessary for addendum of $\Delta x$ and G stands for the length along the lead of the hob blade 1 relative to the central angle $\theta$.

Accordingly, the slant angle $\epsilon$ of the guide groove 31 is determined so that the cutting tool 25 cuts the side face of the hob 1 at the angle $\epsilon_0$ along the pitch circle of the imaginary gear.

For formation of the side relief on the hob blade 1, the cutting tool 25 is exchanged for the cutting tool 26, the pin 29 is inserted into the pin holes 27 and 28, the cutting tool 25 is set at the position of the side face 42 of the hob blade 1, and the supporting shaft 11, swivel table 13 and cam 32 are rotated at the same speed as mentioned above.

Thus, by the action of the cam, the substrate plate 19 is advanced at a constant speed synchronously with the frequency at which the hob blade 1 passes through the cutting position. The substrate plate 19 is then retracted abruptly, and the substrate plate 19 repeats this cycle of advancing and retracting movements. Accordingly, also the cutting tool 25 attached and fixed to the cutting tool attaching stand 23 is turned synchronously with the frequency of the passing of the hob blade 1 through the cutting position and is then returned abruptly, and the cutting tool 25 repeats this cycle of movements. Therefore, by the action of the cutting tool 25, one side face 42 of the hob blade 1 can be cut away along the pitch circle P.C. of the imaginary gear generated by the hob blank 52.

After the relief has thus been formed on one side face 42, the hob blank 52 is dismounted from the supporting shaft 11 and is then remounted thereon so that the left and right sides of the hob blank 52 are reversed. If the relief forming operation is conducted in the same manner as described above, an addendum corresponding to the undercut of the crest face 41 of the hob blade 1 owing to the peripheral relief is attained and the thickness is accordingly reduced in the tooth profile. Thus, there can be formed a spherical hob having such reliefs on both the side faces of the hob blade 1.

Accordingly, when the hob blade 1 is worn by generation of gears and the sharpness thereof is reduced, if the blade face 43 is cut so that the rake angle is not changed, there is formed a fresh blade face 43 having an involute tooth profile which is made thinner than the profile of the blade face 43 before cutting by a quantity corresponding to the addendum equal to the undercut of the peripheral relief. Namely, the tooth profile of the imaginary gear generated by the fresh blade face 43 has an addendum relative to the tooth profile of the imaginary gear generated by the original blade face 43. Accordingly, after cutting and sharpening of the blade face 43, if the hob is shifted toward the gear material by a distance corresponding to the undercut of the peripheral relief and the gear generation is carried out in the same manner as before cutting and sharpening of the blade face 43, a gear having the same tooth profile as that of the gear generated before cutting and sharpening of the blade face 43 can be generated.

As will be apparent from the foregoing illustration, the method of the present invention can attain an effect of providing spherical hobs having the characteristic that even if the blade faces are cut, gears having the same profile and size can always be generated.

In the foregoing embodiment, the blade spaces 5 are formed in parallel to the axis L, but if they are formed obliquely to the axis L, it is necessary to change the indexing ratio in the relief indexing mechanism 34. This arrangement will now be described.

Supposing that the machine constant is F and the blade space number is N as described above, the indexing ratio $\eta_0$ of an ordinary cylindrical hob is expressed as follows:

$$\eta_0 = FN$$

As described hereinbefore, the indexing ratio $\eta_1$ of the spherical hob having the blade spaces 5 coplanar to the axis L is expressed as follows:

$$\eta_1 = FN\left(1 - \frac{1}{NZ}\right)$$

Figure 20:
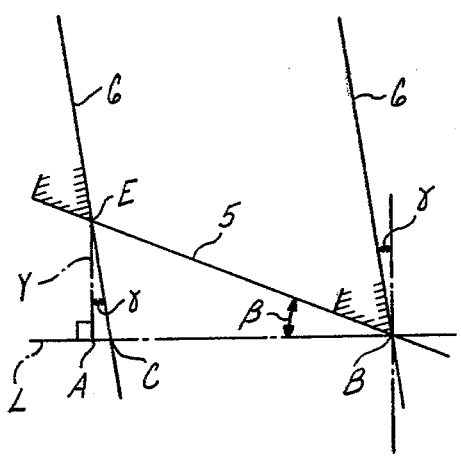
FIG. 20 is a graph illustrating the relation between the inclined blade space and the indexing ratio.
Figure 21:
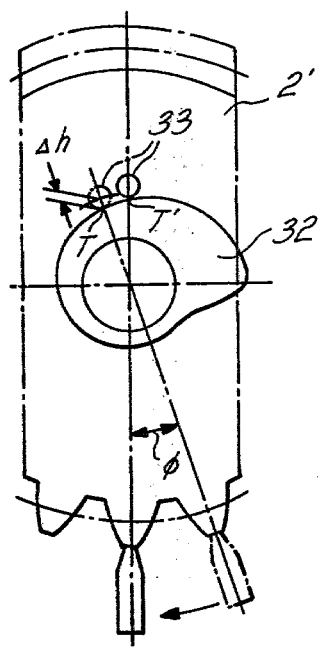
FIG. 21 is a rough plan view of relationship of position of rotation of cam due to blade swivel and follower.

In the case of the blade space 5 with the side rake angle $\beta$, that is, as FIG. 20 shows, when the blade space 5 is inclined to the axis L by $\beta$ the indexing ratio must be compensated. The compensating ratio for that $\eta'_2$, is, referring to FIG. 20 about the cutting edge on the pitch circle of the spherical hob, expressed as follows:

$$\eta'_2 = \frac{\pi D \pm \overline{AE}}{\pi D} \qquad (1)$$

supposing that the lead angle of the hob is $\gamma$, the crossing point of the line Y and the axis L is A, the crossing points of the adjacent screw slots 6 and the axis L are B and C, respectively, the crossing point of the blade space 5 and the screw slot 6 is E and the outside circumference of the hob is $\pi D$.

$$\overline{AE}\tan\gamma = \frac{\pi m}{1 - \tan\beta\cdot\tan\gamma} - \pi m$$
$$= \frac{\pi[1 - (1 - \tan\beta\cdot\tan\gamma)]}{1 - \tan\beta\cdot\tan\gamma}$$
$$= \frac{\pi m\cdot\tan\beta\cdot\tan\gamma}{1 - \tan\beta\cdot\tan\gamma}$$
$$\therefore \overline{AE} = \frac{\pi m\cdot\tan\beta\cdot\tan\gamma}{1 - \tan\beta\cdot\tan\gamma}\cdot\frac{1}{\tan\gamma}$$
$$= \frac{\pi m}{1 - \tan\beta\cdot\tan\gamma}\cdot\tan\beta$$

Accordingly, the above formula (1) can be expressed as follows:

$$\eta'_2 = 1 \pm \frac{1}{\pi D}\cdot\frac{\pi m}{1 - \tan\beta\cdot\tan\gamma}\cdot\tan\beta$$
$$= 1 \pm \frac{m}{D}\cdot\frac{\tan\beta}{1 - \tan\beta\cdot\tan\gamma}$$

Since the module m is represented by the following formula:

$$m = \frac{D\text{ (diameter of pitch circle)}}{Z\text{ (tooth number)}}$$

the correction ratio $\eta'_2$ is expressed as follows:

$$\eta'_2 = 1 \pm \frac{1}{Z} \cdot \frac{\tan\beta}{1 - \tan\beta \cdot \tan\gamma}$$

Therefore, the indexing ratio $\eta_2$ of the cam when the blade space is slanted is:

$$\eta_2 = FN(1 - \frac{1}{NZ})(1 \pm \frac{\tan\beta}{Z(1 - \tan\beta \cdot \tan\gamma)})$$

While the present invention has been disclosed herein in connection with certain preferred embodiments and certain structural details, it is clear that changes, modifications or equivalents can be made without departing from the spirit and scope of the invention and that the present invention is not limited to particular embodiments but is defined by the appended claims.

What I claim is:

1. A method for the preparation of a spherical hob for generation of a gear, which comprises rotating a spherical hob blank about an axis passing through the center thereof and simultaneously rotating a cutting tool having a profile corresponding to a tooth space of an involute gear about the center of said hob blank and along the peripheral surface of said hob blank on a plane passing through said axis, thereby to form projections having a section in the form of an involute tooth profile spirally on the peripheral surface of the hob blank, then forming by cutting on the peripheral surface of the hob blank a plurality of equidistantly arranged spaces across said projections, thereby to divide said projections into a plurality of spirally continuous hob blades, each having an involute tooth profile, and finally forming reliefs on the side faces and the peripheral face of the hob blades so that as the blade faces of the hob blades are cut and sharpened the tooth profile of an imaginary gear generated by rotation of the hob about said axis is gradually displaced to attain an addendum to the tooth profile, whereby after cutting and sharpening of the hob blade faces after said faces have become dull from use in cutting gears in gear blanks, shifting of the hob toward a new gear blank by a distance corresponding to the magnitude of undercut of the peripheral relief results in cutting in the new gear blank of a gear generated in gear blanks before cutting and sharpening of the blade faces.

2. A method for the preparation of a spherical hob according to claim 1 wherein each blade space is cut coplanar to the axis of the hob blank and said reliefs are cut by advancing a cutting tool at a constant speed toward the center of the hob blank at a frequency represented by the following formula $FN(1 - 1/NZ)$ wherein N stands for the blade space number, Z stands for the tooth number of an imaginary gear generated by rotation of the hob blank and F denotes a machine constant, for every one rotation of the hob material and then retracting said cutting tool.

3. A method for the preparation of a spherical hob according to claim 1 wherein each blade space is cut obliquely to the axis of the hob blank and said reliefs are cut by advancing a cutting tool at a constant speed toward the center of the hob blank at a frequency represented by the following formula:

$$FN(1 - \frac{1}{NZ})(1 \pm \frac{\tan\beta}{(1 - \tan\beta \cdot \tan\gamma)})$$

wherein N stands for the blade space number, Z stands for the tooth number of an imaginary gear generated by the hob material, F denotes a machine constant, $\beta$ designates an angle of the blade space to the axis and $\gamma$ stands for an angle of the screw slot of the hob blade to the rotation direction of the hob blank for every one rotation of the hob material and then retracting said cutting tool.

4. A method for the preparation of a spherical hob according to claim 1 wherein said side reliefs are cut by cutting side faces of each hob blade at an angle represented by the following formula:

$$\tan^{-1}\frac{\Delta S/2}{G}$$

wherein $\Delta S = 2\Delta x \cdot \tan\alpha$, $\alpha$ is the standard pressure angle, $\Delta x$ stands for the amount of the undercut of the peripheral relief, $\Delta S$ stands for the amount the tooth thickness is decreased and G designates the amount of regrinding of the hob blade necessary for attaining an undercut of magnitude $\Delta S$, by rotating a cutting tool having a profile corresponding to a tooth space of an involute gear with the center of the hob blank being the center of rotation and said peripheral relief is cut by rotating said cutting tool at the same frequency as that adopted for fomation of the side reliefs.

* * * * *